United States Patent [19]
Pollard et al.

[11] Patent Number: 5,327,167
[45] Date of Patent: Jul. 5, 1994

[54] PRINTING CYLINDER ENGRAVING

[75] Inventors: Brendan T. Pollard, Betchworth; Terence E. J. Marsh, Addleston, both of England

[73] Assignees: Zed Instruments Limited, Hersham; Brendon T. Pollard, Betchworth, England

[21] Appl. No.: 958,129
[22] PCT Filed: Apr. 26, 1991
[86] PCT No.: PCT/GB91/00662
    § 371 Date: Dec. 28, 1992
    § 102(e) Date: Dec. 28, 1992
[87] PCT Pub. No.: WO91/16784
    PCT Pub. Date: Oct. 31, 1991

[30] Foreign Application Priority Data

Apr. 26, 1990 [GB] United Kingdom ............... 9009406

[51] Int. Cl.⁵ .................... H04N 1/21; B41J 2/435
[52] U.S. Cl. .................... 346/108; 358/299
[58] Field of Search .............. 346/76 L, 107 R, 108, 346/1.1, 160; 358/298, 299

[56] References Cited
U.S. PATENT DOCUMENTS

| | | |
|---|---|---|
| 4,004,079 | 1/1977 | Boston ............... 358/302 |
| 4,040,094 | 8/1977 | Everett et al. . |
| 4,450,485 | 5/1984 | Oshikoshi et al. ............ 358/298 |
| 4,623,972 | 11/1986 | Darby et al. ............ 358/298 |
| 4,806,949 | 2/1989 | Ohnishi ............ 346/108 |
| 4,985,779 | 1/1991 | Gall ............ 358/298 |

FOREIGN PATENT DOCUMENTS 0072609  2/1983  European Pat. Off. .

Primary Examiner—Mark J. Reinhart
Attorney, Agent, or Firm—Sughrue, Mion, Zinn, Macpeak & Seas

[57] ABSTRACT

When laser engraving flexographic and rotary screen printing cylinders half-tones are generated by providing a series of regularly spaced cells (1) including dots or pits (3) which collectively are referred to as a screen. By varying the ratio between the areas of the dots or pits (3) and the cells (1) the intensity of the half-tone is varied. A laser engraving machine for engraving such printing cylinders includes variable timing means (37, 38) which are triggered by their engraving head (13) crossing into each cell (1) and which generate a variable time delay (D) to determine the start time of the laser engraving in each pass of each cell (1) and also to determine the duration (P) of the time for which the laser is turned ON to engrave material during each pass of each cell.

11 Claims, 6 Drawing Sheets

PRINTING CYLINDER ENGRAVING

When laser engraving flexographic and rotary screen printing cylinders half-tones are generated by providing a series of regularly spaced dots or pits which collectively are referred to as a screen. When printing in color it is conventional to arrange for an axis of the dot or pit patterns which is usually referred to as the screen angle, to be different for each different color separation. This helps to avoid the generation of Moire defects.

A typical laser engraving machine includes a motor to rotate a printing cylinder about its longitudinal axis, a laser, an engraving head which focuses a beam from the laser onto the surface of the printing cylinder to ablate selected portions of the printing cylinder, a drive to move the engraving head along the printing cylinder parallel to its longitudinal axis, a laser controller arranged to control operation of the laser engraving head, and position encoders coupled to both the printing cylinder and the drive for the engraving head to provide data for the laser controller corresponding to the current location of the engraving head with respect to the printing cylinder to enable it to control the operation of the laser.

In laser engraving the size and angle arrangement of the screens is controlled by software input into the laser engraving machine so that it is as if the printing cylinder to be engraved has a layout of imaginary lines defining the boundaries of a large number of identical cells arranged in a regular array around its surface. By reading out the angular position of the printing screen from the encoders the laser engraving machine can determine at any instant when its engraving head notionally crosses a boundary of one of the cells as it moves in a helicoidal fashion over the surface of the printing cylinder. The present invention is concerned primarily with how the laser engraving machine responds after its engraving head notionally crosses the boundaries of one of these cells to remove the required amount of material from inside that cell to give a dot or pit of the required size for the final half-tone required on printing from that printing cylinder.

At present the surface of the printing cylinder is notionally divided into a number of pixels defined in one dimension by the output of the position encoder coupled to the printing cylinder and in the other dimension by the pitch of the helix engraved by the laser engraving machine. The laser engraving machine is then arranged to ablate material from one or more of the pixels in each cell to provide the required half-tone image. There are therefore only a limited number of discrete grey levels that can be achieved corresponding to the number of pixels per cell. With fine screens i.e. those with small cells, this problem increases resulting in only a coarse control of the intensity of a resulting half-tone. At present the only way in which this can be improved is by providing higher precision encoders that can resolve the angular position of the printing cylinder to a greater accuracy. At present the best that can be achieved is a pixel having a circumferential extent of around 10 microns.

In accordance with this invention such a laser engraving machine includes variable timing means which are triggered by the engraving head crossing into each cell and which generate a variable time delay to determine the start time of the laser engraving in each pass of each cell and also to determine the duration of the time for which the laser is turned ON to engrave material during each pass of each cell.

By triggering the variable timing means at the start of each cell and then controlling the engraving by varying the delay before switching ON the laser and by controlling the duration for which the laser is maintained ON provides a more accurate control which provides a higher resolution and thus more finely controlled half-tone than can be achieved merely by clocking the turning ON and OFF of the laser from the angular position encoder associated with the printing cylinder.

Taking a simple example where the timing means is driven by a 1MHz clock and the laser engraving machine operates at a typical engraving speed of 1 meter/second such an arrangement would provide a resolution on the surface of the printing cylinder of 1 micron, some ten times better than the most accurate prior art and, of course, if a higher resolution is required it is simple to use a higher frequency clock. A tenfold increase in resolution in the scanning direction leads to a considerable increase in the number of grey levels that are available since, potentially, this increases by ten times the number of passes in each cell. The arrangement in accordance with this invention enables a more accurate reading of the required grey level and smoother vignettes.

Preferably the amplitude of the laser is varied for each turning ON in accordance with the time for which the laser is to be turned ON and in accordance with the intensity of the half-tone that is to be printed from the printing plate. The amplitude of the laser may also be varied throughout each engraving step. Thus, where the laser is only turned ON for very short period it is sometimes desirable to increase its power sufficiently to ensure that the laser "gets going" quickly enough to form effectively a short engraving. Equally, it is possible to increase the power of the laser as engraving proceeds in each cell so that some compensation is made for the laser beam being obscured by the generation of debris in an earlier portion of the engraving in each cell. Alternatively, it is sometimes necessary to reduce the power of the laser during each engraving to ensure that the laser can be turned OFF rapidly when required.

By varying both the timing of the laser from the start of each cell and the duration of each engraving pulse and also by varying the power of the laser it is possible to have a considerable influence on the shape of the material ablated from the surface of the printing cylinder, particularly in the case of engraving a flexographic material. For example, when a very high power is used for the laser the engraved regions tend to have round shoulders whereas when a lower power is used the engraved regions have sharper more precisely defined shoulders. In this way it is possible to define edges of the engraved dots or other images with a lower power laser beam but to use a higher power beam to remove larger areas of the printing cylinder where accuracy is less important. Further, the effect of nitrogen lag can also be overcome.

There is one fundamental difference between the preparation of a flexographic and a gravure printing cylinder which results directly from the differences in their types of printing. In a gravure printing cylinder the material which is ablated from the printing cylinder provides a pit which, during subsequent printing, contains the ink and so provides the shape which is printed. On the other hand, during the preparation of a flexographic printing cylinder the material from the surface of the printing cylinder which remains is the portion of the flexographic plate which carries the ink and so is the portion which defines the shape of the part which is subsequently printed.

A particular example of a laser engraving machine in accordance with this invention will now be described with reference to the accompanying drawings in which.

Figure 1:
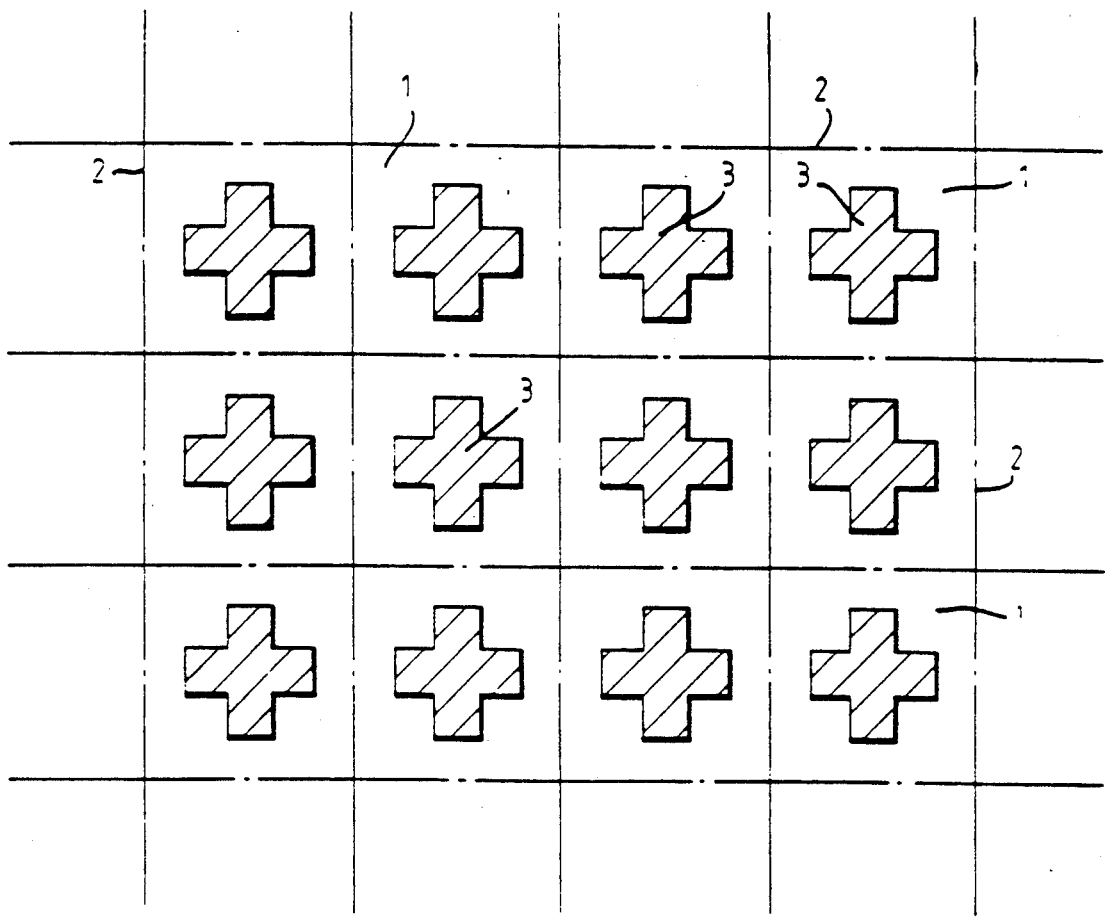
FIGS. 1, 2 and 3 are dot patterns for different densities of half-tone.
Figure 2:
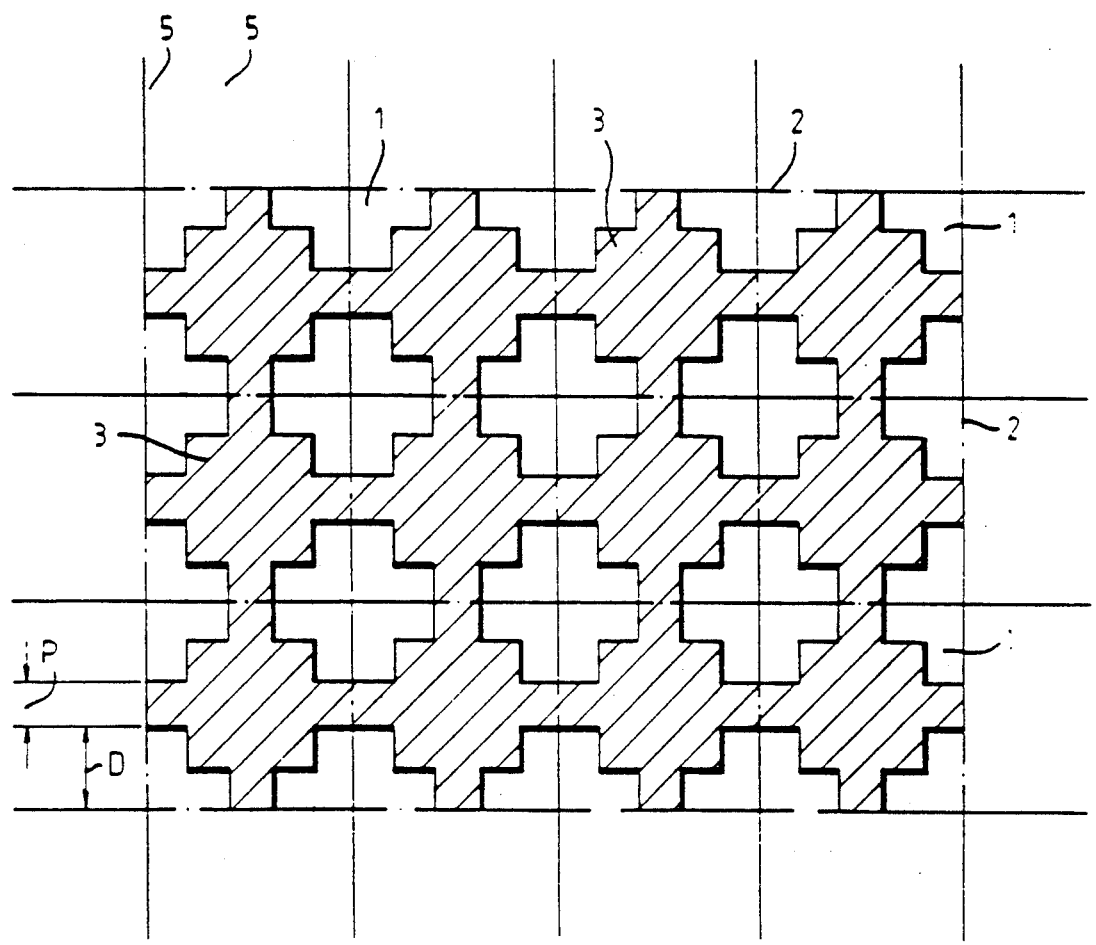
Figure 3:
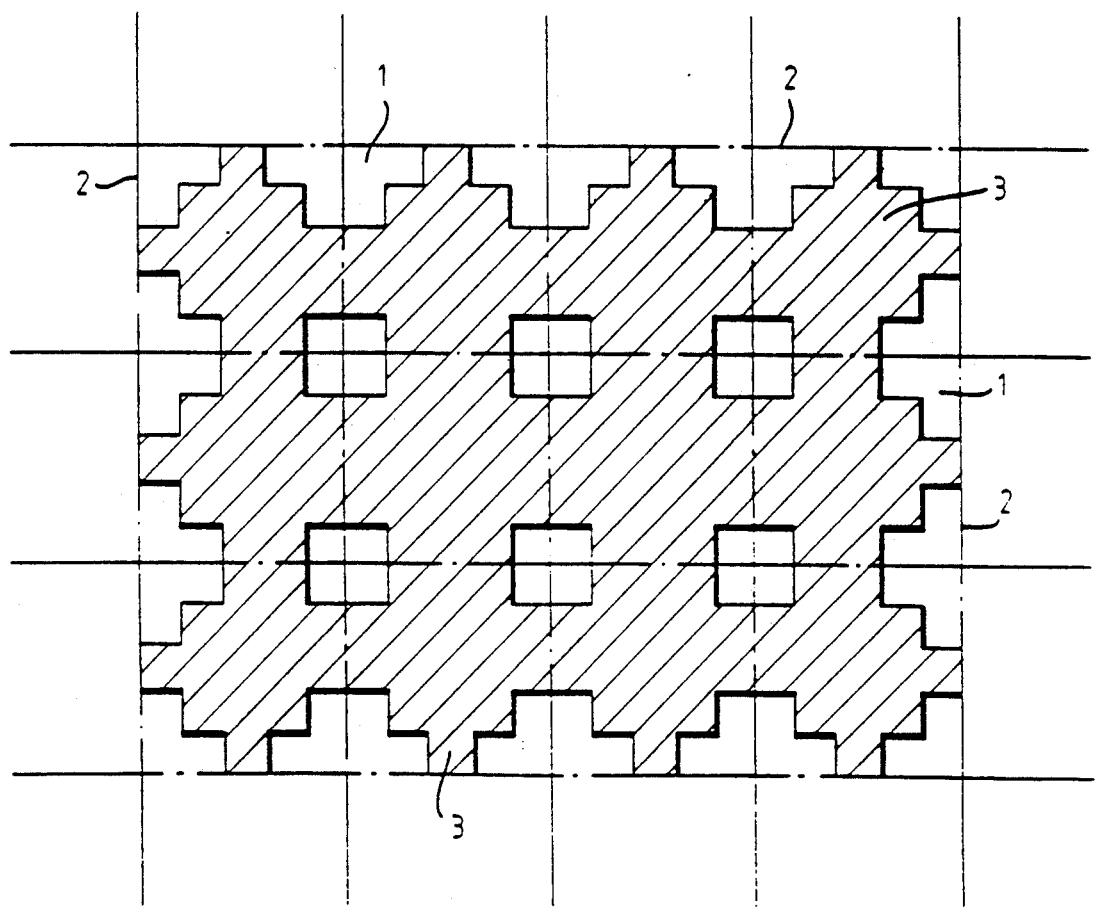
Figure 4:
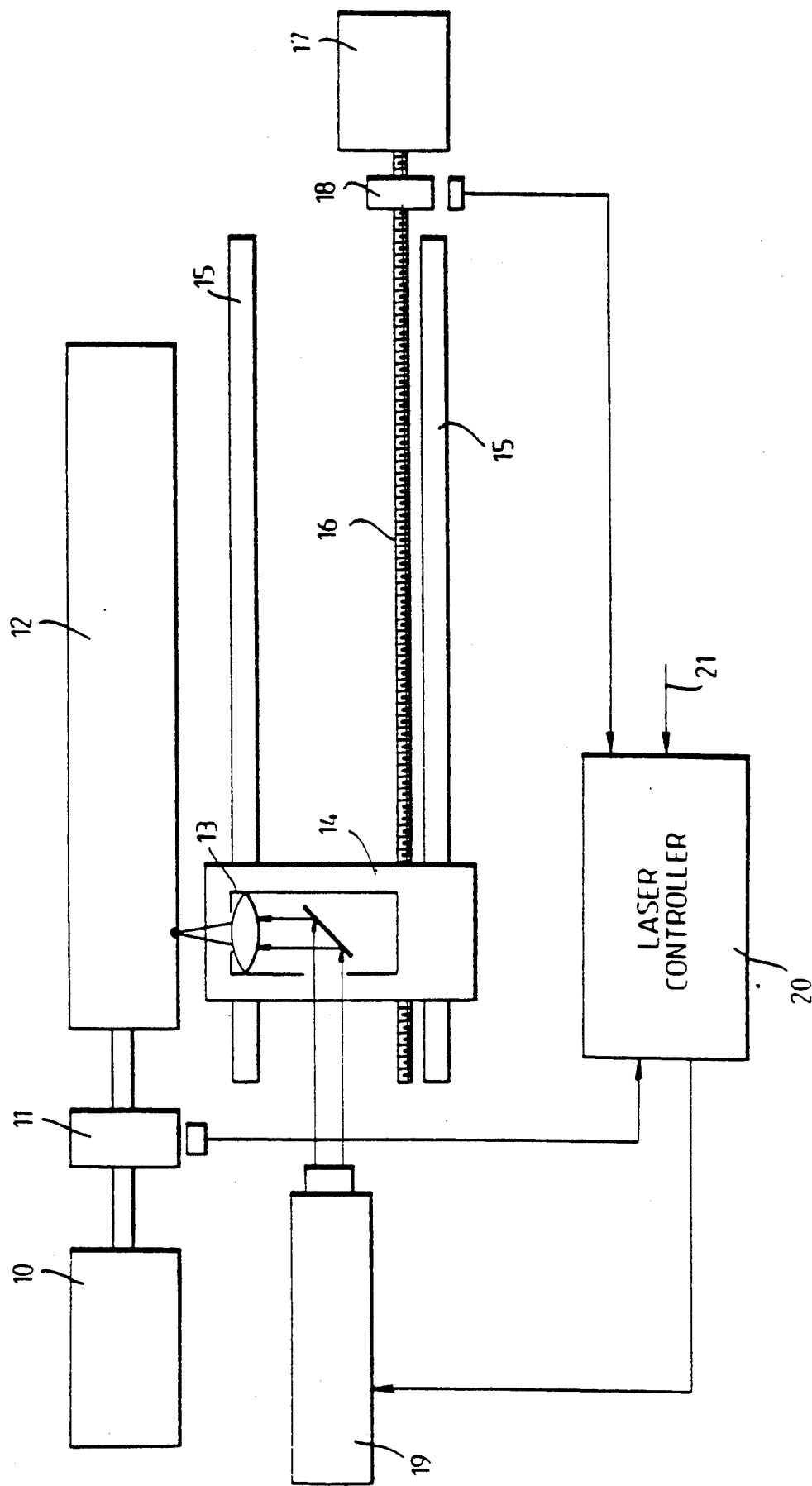
FIG. 4 is a diagrammatic plan of a laser engraving machine.

FIGS. 1, 2 and 3 show to a very much enlarged scale a typical dot pattern that is generated for an area of half-tone printing. Cells defined by the imaginary dotted lines 2 include dots 3. The dot corresponds to the area to which ink is applied during a subsequent printing process and the ratio of the area of the dot 3 to the overall area of the cell 1 defines the grey level of the resulting printing. Thus the arrangement shown in FIG. 3 provides a very much darker area of printing than the patterns shown in FIG. 2 or FIG. 1. FIG. 2 is an approximately 50% grey level and, of course, FIG. 1 is correspondingly lighter. Whilst the density of the cells can be varied depending on the fineness of the printing screen selected there are typically around 8 cells per millimeter. The shape of the dot in each of the Figures is generally diamond shaped and, allowing for some rounding of the edges when such shapes are produced by a laser engraving operation and some further rounding as part of a subsequent printing operation it will be seen that the dots do have a generally diamond shape configuration although in areas of high grey level the diamond configuration of the dots in adjacent cells do tend to run into one another.

The basic construction of the laser engraving machine is conventional. One example of such a laser engraving machine is that known as the Zedco Rapide manufactured by the applicants of the present invention. The laser engraving machine comprises a motor 10 connected via an angular position encoder 11 to a printing cylinder 12. The engraving machine also includes a laser engraving head 13 mounted on the carriage 14 which runs on rails 15 and is driven in an axial direction of the printing cylinder 12 along the rails 15 by a leadscrew 16 which in turn is driven by a motor 17 and includes a position encoder 18. The laser engraving head 13 focuses a laser beam generated by a laser 19 onto the printing cylinder 12 to ablate material from its surface. The switching ON and OFF of the laser 19 is controlled by a laser controller 20 which receives image data via an input 21 and receives an output from position encoders 11 and 18 In operation the motor 10 rotates the printing cylinder 12 around its longitudinal axis and the laser engraving head 13 is moved axially by its motor 17 to describe a helical path over the surface of the printing cylinder 12. The image to be formed on the surface of the printing cylinder 12 is produced by selectively operating the laser beam 19 in accordance with the location of the laser engraving head 13 with respect to the printing cylinder 12 as determined by the laser controller 20 from the inputs from the position encoders 11 and 18 to record an image in accordance with the image data fed via the input 21. In all the above respects the laser engraving machine is entirely conventional and will not be described in any further detail.

With the arrangement in accordance with this invention the output from the encoders and 11 and 18 provides an indication of when the laser engraving head 13 reaches the boundaries of each cell 1. At this point a timed delay is generated, as will be described in detail subsequently for the period D shown in FIG. 2 for which the laser beam is held OFF. On the time-out of the period D the laser 19 is switched ON for a further predetermined time period P, again shown in FIG. 2 to ablate a region of the printing cylinder corresponding to that within the dotted lines 5 shown in FIG. 2. By increasing the length of the time for which the laser beam is held ON the length of the region ablated is increased and, vice versa. On the following pass of the laser beam across the cell 1 as indicated by the space between the adjacent dotted lines 5 a further portion of the dot is created. Thus, the start of each cell is determined by output pulses from the position encoder 11 which assures that adjacent passes are held in register with one another to ensure that each cell 1 is correctly formed whilst, at the same time, the resolution with which the length of each ON period can be determined is typically very much higher than that provided by the position encoder 11. The way in which this is achieved will now be described in detail.

Figure 5:
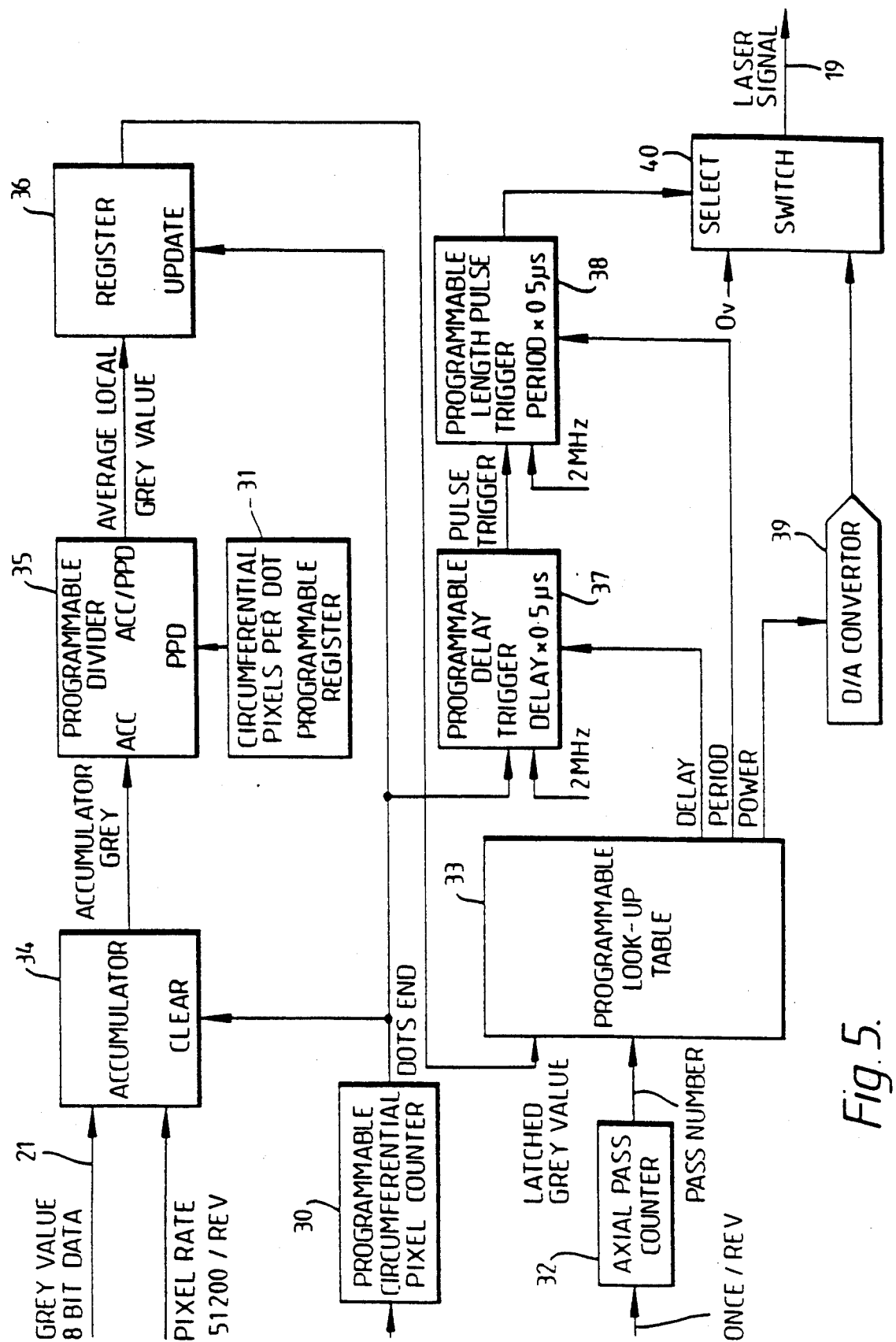
FIG. 5 is a block diagram of the laser control system.

The laser controller 20 is shown in more detail in FIG. 5. Before engraving can begin the system software sets-up a number of parts of the hardware. As part of this the machine operator selects a screen size which defines the number of dots per inch or centimeter and also defines the numbers of passes of the laser beam per cell 1. The software calculates the number of circumferential pixels per cell by comparing the number of pulses output by the position encoder with the cell size and sets-up a programmable pixel counter 30 and a circumferential pixels per dot register 31. An axial pass counter 32 is set to count modulo the required number of passes per cell.

From the selected screen size and surface speed of the printing cylinder 12 the software also calculates the circumferential size of each cell 1 in terms of time. For each shade of grey and each pass of the dot the software then calculates the required delay time D and period time P in multiples of $\frac{1}{8}$ microseconds to generate the appropriate dot shapes corresponding to each shade of grey. These values are then loaded into a programmable look-up table 33. For each time that the laser beam is turned ON the software produces a power level dependent on the length of the ON period. The operator sets the power levels for zero and that for the maximum period and then the software linearly interpolates the power levels for intermediate values of the ON period. These values are also loaded into the look-up table 33.

The required grey values are input into input 21 as an 8-bit number to an accumulator 34 together with an indication of the pixel rate which is dependent of course upon the pitch of the angular encoder 11 and, in this example, 51,200 per revolution. The instantaneous grey values are accumulated for the circumferential length of each cell and the sum is divided by the number of divisions, in practice, the number of distance units that it takes to pass one cell to produce an average grey value for each cell. The average is produced in the programmable divider 35 by dividing the output of the accumulator 14 by the output of the circumferential pixels per dot programmable register 31. The average local grey value output from the programmable divider 35 is then latched into a register 36. At the end of each cell the accumulator 34 is cleared ready to accumulate the data for the next cell by an output from the programmable circumferential counter 30 applied to its CLEAR input. Equally, it is the output from the programmable circumferential counter 30 which causes the register 36 to be updated with the latest average grey value. The latched local grey value from the register 36 is input to the programmable look-up table 33 together with the pass number output by the axial pass counter 32. The programmable look-up table then provides outputs corresponding to the delay period D, the on period P, and the power output to programmable delays 37 and 38 and a digital-to-analogue converter 39, respectively. The programmable delays 37 and 38 both multiply the delay period P and the ON period P by 0.5 microseconds, which is the time period with which this example operates since both delays are clocked by a 2 MHz clock. Thus, at the start of the next cell 1 the programmable delay circuits 37 and 38 operate firstly to count down the set number of half microseconds loaded into the programmable delay circuit 37 to delay the switching ON of the laser 19 until this time period has timed out. As soon as it has timed out the SELECT port of a switch 40 is enabled to turn ON the laser 19. The laser 19 is then maintained ON throughout the count down period of the programmable delay 38. During the time that the switch 40 is enabled by the output of the programmable delay 38 its power is controlled in response to a value having previously been entered into the look-up table 33 and applied to the laser 19 via the digital-to-analogue converter 39.

Figure 6:
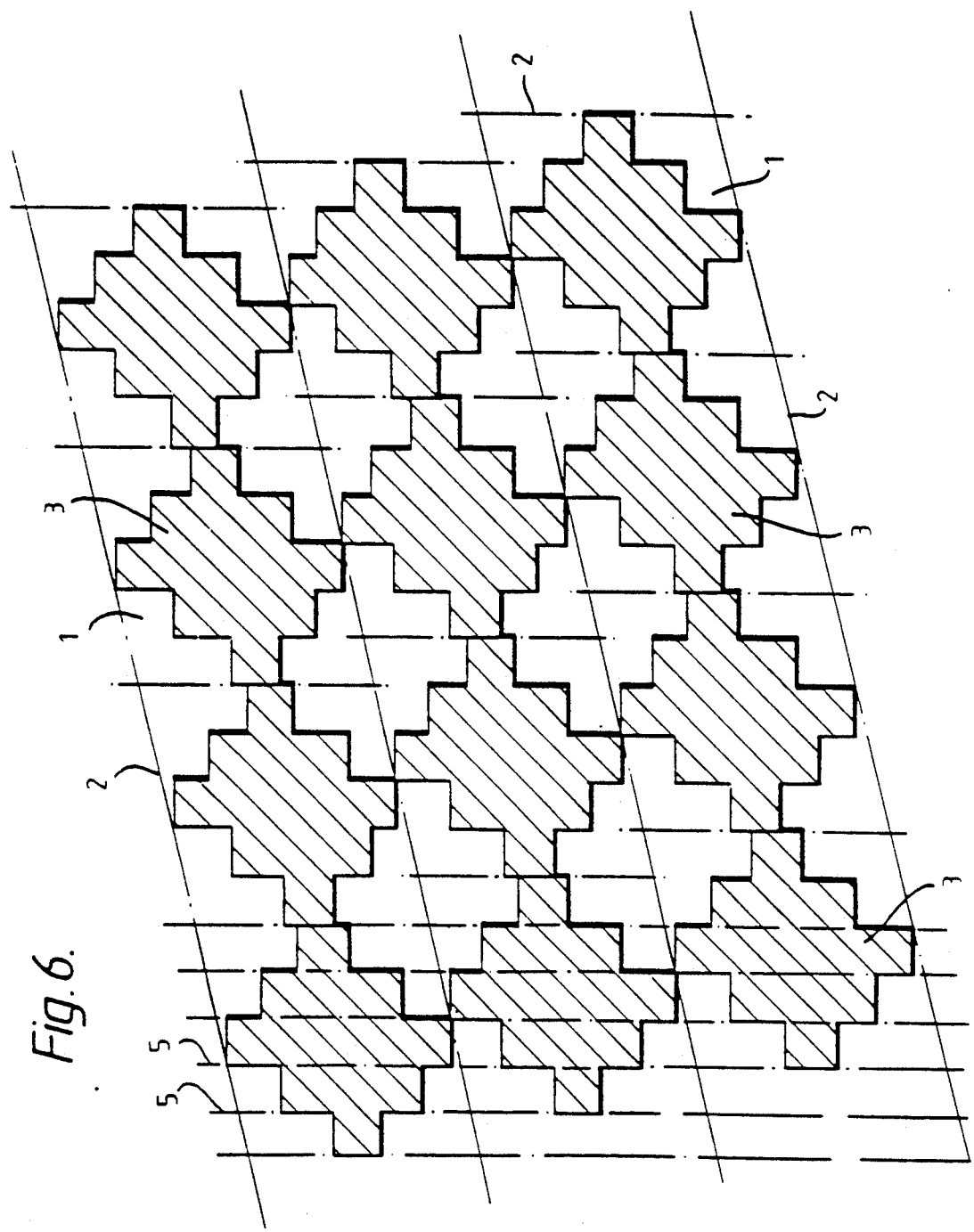
FIG. 6 is a half-tone pattern at a different screen angle.

With the arrangement described so far with the axial pass counter 32 being clocked once per revolution the dot cells are lined one above the other as shown in FIGS. 1 to 3. Thus, the screen angle is zero. As we have explained it is more common to use a screen set at other than a zero screen angle and, particularly when printing in color to use the screens for each different color separation at a different screen angle. To achieve this each cell is axially shifted or side stepped by one or more passes relative to the cell above and, to maintain the axes of each cell generally orthogonal each pass is usually circumferentially spaced from its neighbor. The number of side steps and circumferential steps is programmable by the operator to achieve the desired screen angle. The different side steps are achieved by mapping the data with a look-up table in a non-sequential manner. FIG. 6 illustrates graphically what happens when a screen angle different from zero is used and illustrates how the pattern varies. The adjustment of the screen angle to be other than zero is again conventional and will not be described in any more detail.

We claim:

1. A laser engraving machine including a motor (10) to rotate a printing cylinder (12) about its longitudinal axis, a laser (19), an engraving head (13) which focuses a beam from the laser (19) onto the surface of the printing cylinder (12) to ablate selected portions of the printing cylinder (12), a drive (14,16,17) to move the engraving head (13) along the printing cylinder (12) parallel to its longitudinal axis, a laser controller (20) arranged to control operation of the laser engraving head (13), and position encoders (11,18) coupled to both the printing cylinder (12) and the drive (16;17) for the engraving head (13) to provide data for the laser controller (20) corresponding to the current location of the engraving head (13) with respect to the printing cylinder (12) to enable it to control the operation of the laser; characterized in that it includes variable timing means (37,38) which are triggered by the engraving head (13) crossing into each cell (1) and which generate a variable time delay to determine the start time of the laser engraving in each pass of each cell (1) and also to determine the duration of the time for which the laser is turned ON to engrave material during each pass of each cell (1).

2. A laser engraving machine according to claim 1, in which the amplitude of the laser is varied for each turning ON in accordance with the time for which the laser is to be turned ON and in accordance with the intensity of the half-tone that is to be printed from the printing plate.

3. A laser engraving machine according to claim 2, in which the amplitude of the laser is also varied throughout each engraving step.

4. A laser engraving machine according to claim 2, in which the laser controller (20) comprises a programmable look-up table (33) loaded with the laser ON period (P), and the delay period (D) and which is addressed by the grey value to provide the appropriate laser ON (P) and delay (D) periods corresponding to the input grey levels.

5. A laser engraving machine according to claim 4, in which the programmable look-up table (33) is also loaded with a power value for each grey level.

6. A laser engraving machine according to claim 3, in which the laser controller (20) also includes an accumulator (34) to accumulate the grey values required for one cell (1) and a programmable divider (35) to divide the accumulated grey value by the number of time intervals per cell (1) to provide an average grey level per cell (1), the average grey level per cell then being used to address the look-up table (33).

7. A laser engraving machine according to claim 1, in which the laser controller (20) comprises a programmable look-up table (33) loaded with the laser ON period (P), and the delay period (D) and which addressed by the grey value to provide the appropriate laser ON (P) and delay (D) periods corresponding to the input grey levels.

8. A laser engraving machine according to claim 3, in which the laser controller (20) comprises a programmable look-up table (33) loaded with the laser ON period (P), and the delay period (D) and which is addressed by the grey value to provide the appropriate laser ON (P) and delay (D) periods corresponding to the input grey levels.

9. A laser engraving machine according to claim 4, in which the laser controller (20) also includes an accumulator (34) to accumulate the grey values required for one cell (1) and a programmable divider (35) to divide the accumulated grey value by the number of time intervals per cell (1) to provide an average grey level per cell (1), the average grey level per cell then being used to address the look-up table (33).

10. A laser engraving machine according to claim 7, in which the laser controller (20) also includes an accumulator (34) to accumulate the grey values required for one cell (1) and a programmable divider (35) to divide the accumulated grey value by the number of time intervals per cell (1) to provide an average grey level per cell (1), the average grey level per cell then being used to address the look-up table (33).

11. A laser engraving machine according to claim 8, in which the laser controller (20) also includes an accumulator (34) to accumulate the grey values required for one cell (1) and a programmable divider (35) to divide the accumulated grey value by the number of time intervals per cell (1) to provide an average grey level per cell (1), the average grey level per cell then being used to address the look-up table (33).

* * * * *